United States Patent [19]

Siegel

[11] 4,398,873

[45] Aug. 16, 1983

[54] DEVICE FOR SEALING THE PENETRATION OF DRIVE SHAFT/HOUSING IN ROTARY PUMPS FOR LIQUIDS, ESPECIALLY OIL PUMPS FOR MOTOR VEHICLES

[75] Inventor: Ekkehard Siegel, Russelsheim, Fed. Rep. of Germany

[73] Assignee: General Motors Corporation, Detroit, Mich.

[21] Appl. No.: 293,967

[22] Filed: Aug. 18, 1981

Related U.S. Application Data

[63] Continuation of Ser. No. 83,102, Oct. 9, 1979, abandoned.

[30] Foreign Application Priority Data

Oct. 27, 1978 [DE] Fed. Rep. of Germany ....... 2846823

[51] Int. Cl.³ .......................... F04C 2/10; F04C 15/00; F16J 15/40
[52] U.S. Cl. ...................................... 418/81; 418/77; 418/102; 418/170; 277/135
[58] Field of Search ............................. 418/77, 79–81, 418/102, 170, 171; 277/135, 15; 415/110–112, 170 R, 170 B

[56] References Cited

U.S. PATENT DOCUMENTS

| 845,114 | 2/1907 | Palmer | 418/77 |
|---|---|---|---|
| 879,484 | 2/1908 | Morterud | 415/111 |
| 1,079,561 | 11/1913 | Kinney | 418/102 |
| 1,379,248 | 5/1921 | Carrey | 418/170 |
| 1,676,103 | 7/1928 | Mason | 418/81 |
| 1,863,335 | 6/1932 | Hill | 418/77 |
| 2,064,703 | 12/1936 | Van De Graaff | 277/135 |
| 2,650,116 | 8/1953 | Cuny | 277/15 |
| 2,948,952 | 8/1958 | Wakeman | 418/77 |
| 3,565,550 | 2/1971 | Bellmer | 418/81 |

FOREIGN PATENT DOCUMENTS 510513 9/1920 France .............................. 277/135

*Primary Examiner*—John J. Vrablik
*Attorney, Agent, or Firm*—Donald F. Scherer

[57] ABSTRACT

A liquid pump has a drive shaft which extends through a housing. The high pressure side of the pump is connected through a radial channel with an annular channel formed in the housing surrounding the drive shaft. High pressure liquid in the annular channel prevents the ingesting of air by the pump.

1 Claim, 3 Drawing Figures

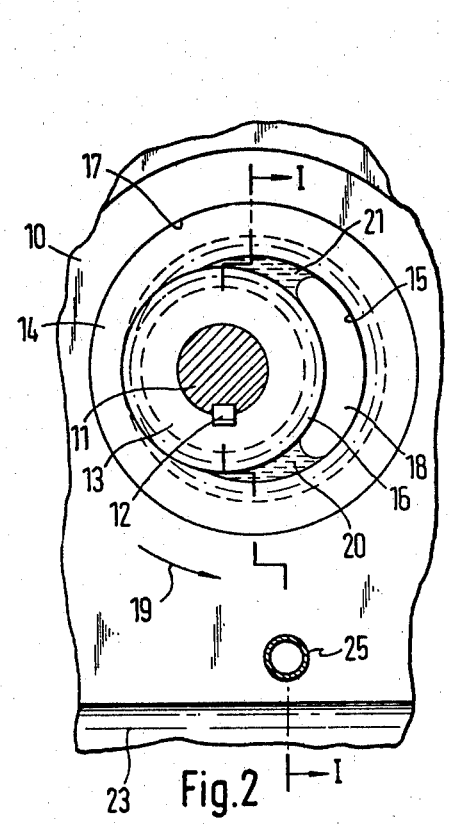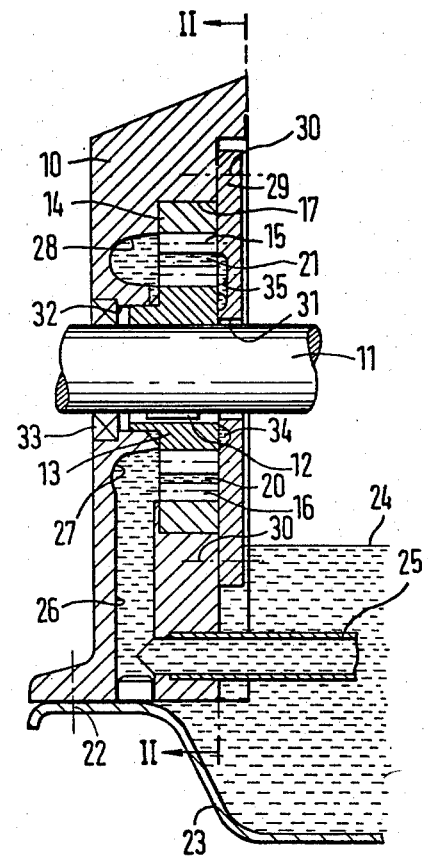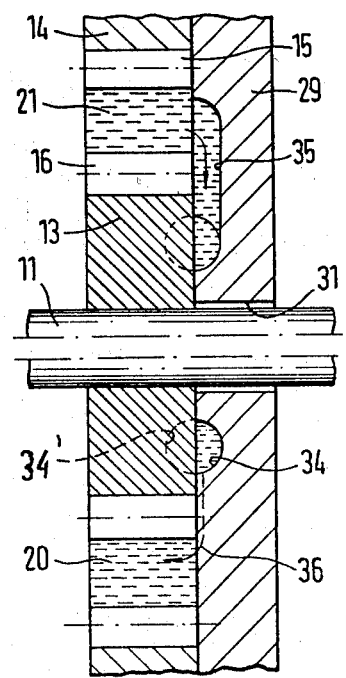
Fig.1
Fig.2
Fig.3

DEVICE FOR SEALING THE PENETRATION OF DRIVE SHAFT/HOUSING IN ROTARY PUMPS FOR LIQUIDS, ESPECIALLY OIL PUMPS FOR MOTOR VEHICLES

This is a continuation of application Ser. No. 083,102, filed Oct. 9, 1979, now abandoned.

The invention concerns a device for sealing the penetration of drive shaft/housing to prevent the aspiration of ambient air in rotary pumps for liquids, especially oil pumps of motor vehicles, in which the axial mobility of the pump gears is bounded at least on one side by a housing part that exhibits a penetration for the drive shaft of the pump gears.

In rotary pumps, e.g. gear or lobe pumps, the pressure difference between the pressure and suction side is generally relatively high, causing the risk of air aspiration from outside. In motor vehicles, such rotary pumps usually serve as oil pumps. Air aspiration together with the lubricating oil is particularly unfavorable here, if hydraulic valve lifter clearance adapters used in modern high-speed internal combustion engines are employed. Even small amounts of air in the pumped oil can cause a very substantial reduction of the maximum possible engine speed.

In order to prevent undesirable aspiration of air in a rotary pump, it is known that the drive shaft passing through the housing of motor vehicle oil pumps can be sealed against the housing by split lip seals. The disadvantage of this sealing method consists of the fact that the split lip seals are subject to high wear and therefore may become unserviceable already after relatively short operation. If this is not promptly detected, the pump will take in an increasing amount of ambient air with progressive wear of the seals. The known method of sealing rotary displacement pumps by means of split lip seals therefore requires continuous inspection and frequent replacement of the seals.

The object of the invention is to provide for a wear-resistant and maintenance-free sealing of rotary displacement pumps of the type described above.

According to the invention, the problem can be solved by the fact that the front face of the inside pump gear facing the housing part or the front face of the housing part facing the pump gears has an annular groove which surrounds the penetration opening for the drive shaft and which serves as a hydraulic seal and is connected with the pressure section of the pump by means of a channel.

The invention makes it possible to generate a substantially higher pressure on the sealing surface of the suction side than the suction pressure. Consequently, aspiration of air through the clearance on the shaft ends extending from the housing is prevented.

It is generally known from German Pat. No. 312,123 that the penetration of air into the transported medium in rotary pumps for the transport of liquids under a vacuum can be prevented by benefiting from the transported medium as a sealing agent. The device of the invention differs from this known state of the art, however, by significantly greater simplicity, a factor that is decisive for standard equipment, such as motor vehicle oil pumps, not only in regard to cost but also in view of the necessary functional reliability. For example, in the subject of German Pat. No. 312,123, an additional weight- or spring-loaded valve is required on the pressure side of the pump chamber in order to generate the overpressure required for the liquid seal. In the subject of the invention, however, the overpressure already existing in the pressure section is utilized without the need for a valve. Another important simplification of the object of the invention compared to the sealing device of German Pat. No. 312,123 must be viewed in the fact that the liquid seal does not require longitudinal and circumferential grooves in the shaft in order to supply sealing fluid to the housing groove. Instead, in the object of the invention, the annular groove machined into the housing part is sufficient because the liquid seal of the invention represents an axial rather than a radial seal. For the rest, the device of German Pat. No. 312,123 also differs substantially in its engineering design from the characteristics claimed in the invention.

The annular groove of the invention which is preferably located concentrically to the penetration for the drive shaft at a relatively small radial distance from the latter, can preferably have a semicircular or essentially semicircular cross-section and be connected with the pressure section of the pump by means of a channel oriented radially outward. A radially oriented groove, also semicircular cross-section, is suitable to serve as the connecting channel between the annular groove and the pump pressure action. Naturally it is also conceivable that the annular groove or connecting channel can be given another arbitrary cross-section, e.g. a triangular, rectangular or square cross-section, or that a suitable connecting bore or connecting line of a different type is placed into the housing part as the connecting channel instead of a groove. The advantage of an annular groove with a suitable connecting groove, however, consists of simple machinability; for example, these grooves can be cast into the respective housing part from the start. However, even subsequent machining to form the groove in the housing part is possible without major expense, particularly since the annular groove is to surround the drive shaft penetration concentrically.

The invention will now be illustrated and explained more fully on the basis of a practical example in the drawing, where:

FIG. 1 shows an oil pump for motor vehicles in vertical section along line I—I in FIG. 2;

FIG. 2 is a section along line II—II in FIG. 1; and

FIG. 3 is a partial section based on FIG. 1 on an enlarged scale compared to FIG. 1.

In the drawing, 10 is the housing and 11 the drive shaft of a motor vehicle oil pump. The drive shaft 11 receives its torque from the crankshaft of the internal combustion engine in the customary manner which is therefore not shown. An external pump gear 13 is mounted on the drive shaft 11 and rigidly connected with the latter by means of a fitting key 12. The pump gear engages with an outer pump gear ring 14 with internal teeth. The external gearing of the inner pump gear 13 is identified by 16. The outer pump gear ring 14 is placed into a cylindrical recess 17 of housing 10, being located eccentrically to the inner pump gear 13 as shown by FIG. 2. This results in a crescent-shaped space between the two pump gears 13 and 14 in which is disposed a conventional crescent shaped member 18 in FIG. 2. As a result of the direction of rotation of parts 11, 13 and 14 identified by arrow 19, the crescent-shaped space is divided, by member 18, into a zone 20 of lower and a zone 21 of higher pressure.

As indicated further by FIG. 1, the oil pan 23 of the vehicle is mounted at the lower end of pump housing 10 at 22. The liquid level of the oil sump present in the oil pan 23 is identified by 24. From the oil sump, an oil intake pipe 25 leads into pump housing 10 in the customary manner. FIG. 1 also shows that the oil in the pump housing 10 reaches the suction section of the pump 27 via a suction line 26. Suction section 27 is hydraulically connected with the above-mentioned low pressure zone 20. Because of the displacement function of the pump produced by rotation of the pump gears 13 and 14, the oil flows from suction section 27 into the pressure section 28 which in turn is hydraulically connected with mentioned higher-pressure zone 21.

FIG. 1 further shows that the cylindrical recess 17 which supports the outer pump gear ring 14 is closed by a housing cover 29 at its open front face, with the use of screws 30 for mounting the housing cover 29 to the pump housing. Drive shaft 11 passes not only through pump housing 10 itself but also through housing cover 29 which is provided with a penetrating opening 31 for this purpose. The corresponding penetration for the drive shaft 11 in housing 10 is identified by 32. Since relatively large pressure differences are prevailing in the pump housing 10, 29, the risk exists because of the two shaft penetrations through housing 10, 29, that ambient air might be aspirated and mix with the transported oil. Therefore, careful sealing of the housing parts 10 and 29 relative to the rotating drive shaft 11 is necessary at both shaft penetrations 31 and 32. At penetration 32 of housing 10, this sealing function is assumed by a radial shaft seal ring 33 of conventional design. However, a liquid seal is provided on the shaft penetration 31 on the cover side. This seal consists of an annular groove 34 of semicircular cross-section surrounding the shaft penetration 31 concentrically. As shown by FIGS. 1 and 3, the annular groove 34 is machined into the housing cover surface 29 facing the pump gears 13, 14, which can be accomplished, for example, by machining or by direct casting if the housing cover 29 is manufactured by casting. The annular groove 34 is hydraulically connected with the liquid chambers 21, 28 which are under high pressure by means of a connecting groove 35, oriented radially outward, so that the high pressure of zones 21, 28 also prevails within the fluid located in annular groove 34. Since the annular groove 34 is located radially between lower pressure zone 20 and the shaft penetration 31, aspiration of ambient air through the shaft penetration 31 is reliably prevented by the fluid which is located in annular groove 34 and which is under relatively high pressure.

Since a hermetic seal between the two facing surfaces of pump gears 13, 14, which move in circumferential direction, on the one hand, and the housing cover 29, on the other, is neither possible nor desirable, a slight oil leakage will naturally develop, originating from annular groove 34 and this oil will flow to the lower-pressure zone 20 because of the pressure gradient. In this connection, special reference is made to FIG. 3 where this leakage oil flow is identified by arrow 36. This very slight leakage from the annular groove 34 to the suction side of the pump and from there to the oil sump 24 represents no disadvantage whatsoever and can therefore be accepted without problems.

As an alternative, annular groove 34 can also be machined into the front face of the inside pump gear 13 adjoining the housing part 29. It would then be located as shown in dashes and identified by 34' in FIG. 3.

Naturally, the geometry of the annular groove 34 and the radial connecting groove 35 is by no means limited to the semicircular cross-section as shown in the drawing; instead, all cross-sectional geometries are basically possible, e.g., even a cross-section that can be produced by repeated chamfering on the respective surface of the housing cover 29. Naturally other types of connecting lines are conceivable in place of the radial connecting groove 35, such as a suitable connecting bore between annular groove 34 and pressure zone 21.

The liquid seal 34, 35 of the invention advantageously makes it unnecessary to use the usual mechanical seals which are subject to high wear at the shaft penetration 31, for example, packing glands, O-rings or radial shaft seal rings. The sealing site at the shaft penetration 31 of housing cover 29 therefore no longer requires checking and maintenance.

The embodiments of the invention in which an exclusive property or privilege is claimed are defined as follows:

1. Device for sealing the penetration of drive shaft/-housing to prevent aspiration of ambient air in rotary pumps for liquids, especially oil pumps with an inside gear with external teeth which is driven by a drive shaft and interacts with an internal gear ring surrounding it eccentrically, the gear and gear ring being located in a cylindrical recess of the pump housing, and wherein the axial mobility of the pump gears is bounded at least on one side by a housing cover having an opening for the penetration of the drive shaft characterized by the fact that an annular groove and a connecting channel are machined into the front face of the housing cover facing the inside gear and wherein said annular groove is surrounding the penetration for the drive shaft and serving as a sole hydraulic and only seal for the drive shaft penetration, and is connected with the pressure section of the pump by means of the channel.

* * * * *